United States Patent [19]
Fujishima

[11] Patent Number: 6,140,783
[45] Date of Patent: Oct. 31, 2000

[54] CONTROLLING METHOD OF DISK DRIVING MOTOR AND ITS CONTROLLING DEVICE

[75] Inventor: Makoto Fujishima, Nagano, Japan

[73] Assignee: Sankyo Seiki MFG. Co., Ltd., Nagano, Japan

[21] Appl. No.: 09/191,176

[22] Filed: Nov. 13, 1998

[30] Foreign Application Priority Data

Nov. 20, 1997 [JP] Japan ..................................... 9-318828

[51] Int. Cl.$^7$ .............................. H02P 1/40; G05B 11/01; G05B 13/00
[52] U.S. Cl. ........................... 318/280; 318/560; 318/561
[58] Field of Search .................................... 318/431, 280, 318/284, 560, 561, 362, 369

[56] References Cited

U.S. PATENT DOCUMENTS

| | | | |
|---|---|---|---|
| 4,706,005 | 11/1987 | Iwako | 318/603 |
| 5,250,883 | 10/1993 | Okada | 318/494 |
| 5,783,880 | 7/1998 | Teshima et al. | 310/67 R |

*Primary Examiner*—Michael L. Gellner
*Assistant Examiner*—Mahmoud Anwar A. Mohamed
*Attorney, Agent, or Firm*—Reed Smith Shaw & McClay LLP

[57] ABSTRACT

In a method of controlling a disk driving motor having a rotor to which disks are loaded, an improvement comprises the step of, when the recording/reproducing is performed with respect to a disk, rotating the rotor in a reverse direction by one of a predetermined rotational angle and for a predetermined time during the period from the time the rotor stops rotating in a normal direction to the time the rotor is again driven in the normal direction. A control device for a disk driving motor in accordance with the method is also disclosed.

12 Claims, 5 Drawing Sheets

CONTROLLING METHOD OF DISK DRIVING MOTOR AND ITS CONTROLLING DEVICE

BACKGROUND OF THE INVENTION a. Field of the Invention

The present invention relates to a disk driving motor control device used as a disk rotating device of, for example, floppy disks. More specifically, the present invention relates to a disk driving motor controlling device or a disk driving motor controlling method which can rotate disks with certainty even at startup.

b. Description of the Related Art

With a floppy disk, one of the various recording media, the recording and reproduction are performed when a magnetic head contacts the disk. If, after the floppy disk stops rotating, the magnetic head remains contacting the disk for a while or is exposed in high humidity, it adheres to the magnetic head. Consequently, a large static friction torque is generated between the magnetic head and the disk, causing a problem that the motor cannot be driven when starting to rotate the floppy disk again.

Therefore, the material for a rotor magnet in the disk driving motor must be changed to increase magnetic force of the rotor magnet so that the starting torque of the disk driving motor may be increased.

However, it is expensive to increase the starting torque of the disk driving motor up to the level exceeding the static friction torque caused due to the adhesion of the disk and the magnetic head. To make matters worse, even after increasing the starting torque of the motor with great expense, a satisfactory effect cannot be obtained.

OBJECT AND SUMMARY OF THE INVENTION

Therefore, a primary objective of the present invention is to provide an inexpensive method for controlling a disk driving motor and its controlling device which can ensure disk start up each time.

In accordance with the invention, in a method of controlling a disk driving motor having a rotor to which disks are loaded, an improvement comprises the step of, when the recording/reproducing is performed with respect to a disk, rotating the rotor in a reverse direction by one of a predetermined rotational angle and for a predetermined time during the period from the time the rotor stops rotating in a normal direction to the time the rotor is again driven in the normal direction. The invention also encompasses a control device for a disk driving motor in accordance with the method.

Embodiments of the present invention will be described referring to the drawings.

DESCRIPTION OF THE PREFERRED EMBODIMENTS

Figure 1:
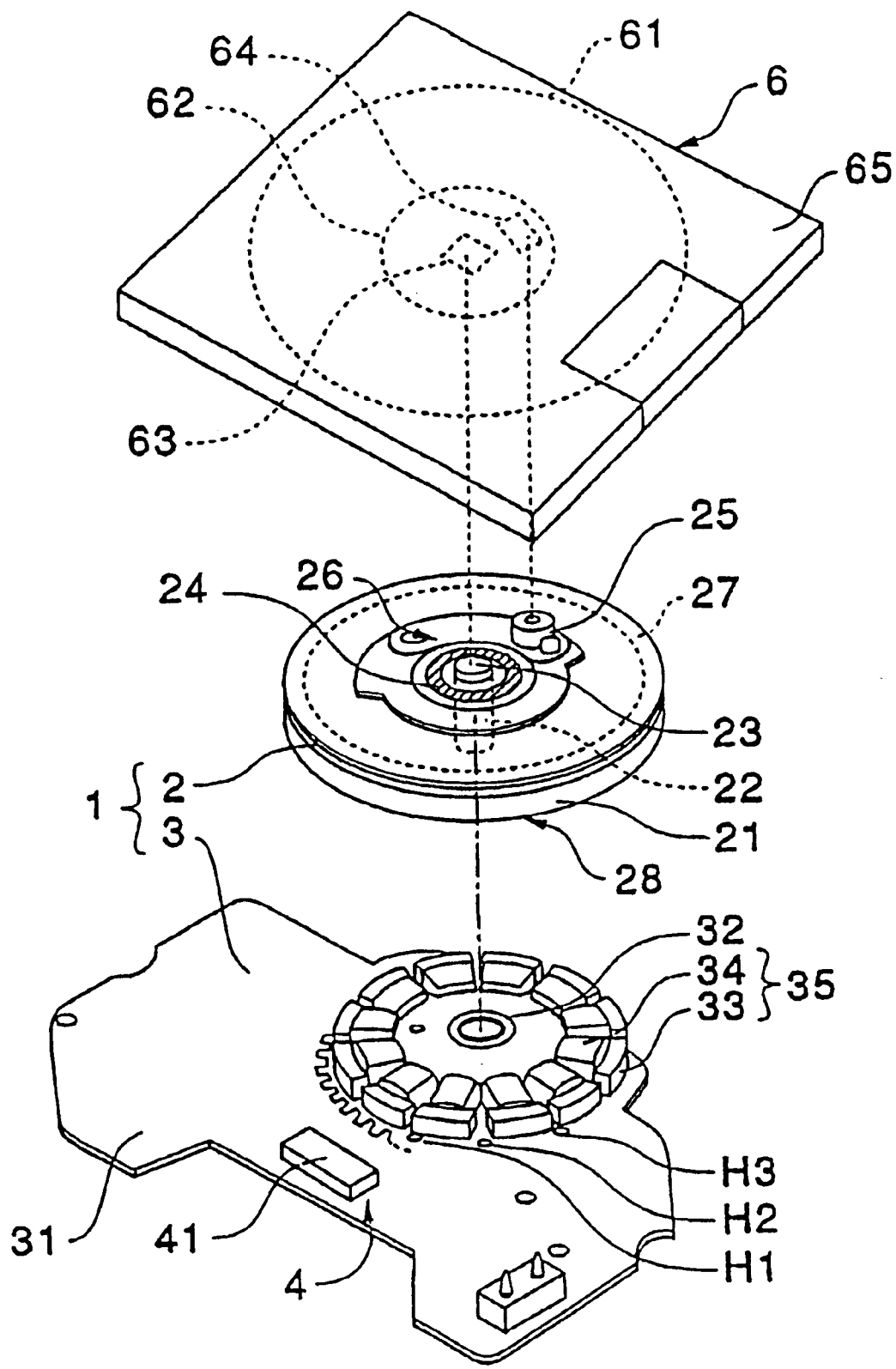
FIG. 1 shows a perspective view of dissembled disk driving motor and floppy disk.
Figure 2A:
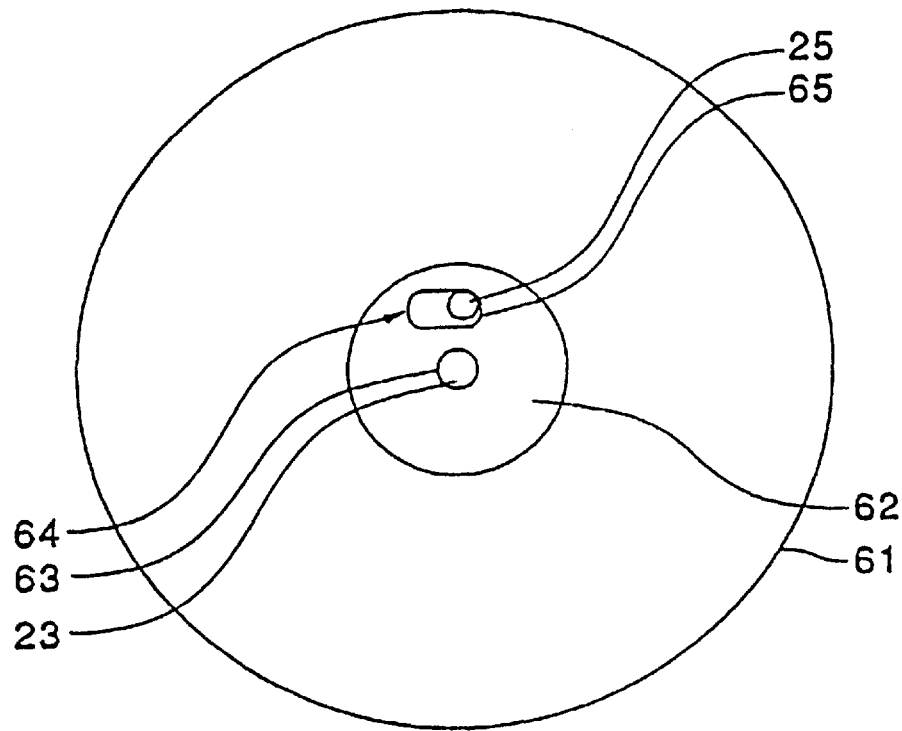
FIG. 2(A) shows a schematic plan view showing the disk driving motor with the floppy disk loaded.
Figure 2B:
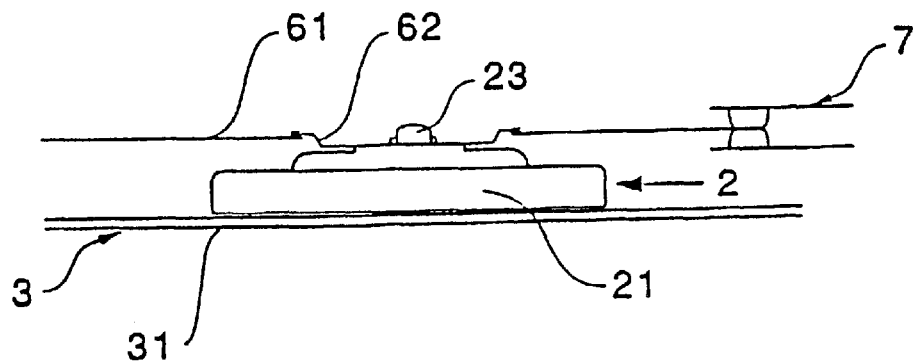
FIG. 2(B) shows a side view of the disk driving motor and floppy disk shown in FIG. 2(A)

FIG. 1 is a perspective view of a dissembled disk driving motor. FIG. 2(A) is a schematic plan view of the disk driving motor with a floppy disk loaded, and FIG. 2(B) is its side view.

In these figures, the disk driving motor 1 (hereinafter denoted as the motor 1) is for driving a floppy disk unit 6 (3.5-inch floppy disk), and comprises a rotor 2 that rotates with a disk 61 stored in a case 65 of the floppy disk unit 6 and a stator 3 for rotating the rotor 2. The rotor 2 has a cup-like rotor case 21, a rotary shaft 22 fitted in the center of the rotor case 21, and an annular rotor magnet 27 attached to an inner circumferential surface of the rotor case 21. A disk mounting portion 26 is constructed on the top surface of the rotor case 21 for mounting the disk 61.

The disk mounting portion 26 includes a tip portion 23 of the rotary shaft 22 projected from the top surface of the rotor case 21, an annular turntable 24 formed on the top surface of the rotor case 21 so as to surround the rotary shaft 22, and a drive pin 25 attached on the top surface of the rotor case 21 and on the outer side of the turntable 24. When the floppy disk unit 6 is loaded on the disk mounting portion 26, a center hub 62 of the disk 61 inside the case 65 of the floppy disk 6 is superimposed on the turntable 24, and the rotary shaft 22 is fitted to a center hole 63 formed in the center hub 62. Then, while the rotor 21 rotates by one turn, the drive pin 25 moves to the position directly under an eccentric hole 64 formed in the center hub 62 and then is fitted therein. Therefore, the drive pin 25 engages with the eccentric hole 64 so that the disk 61 can be rotated together with the rotor 2. A magnetic head 7 contacts the disk 61 to record and reproduce the information with respect to the disk 61. Also, the eccentric hole 64 is positioned such that the drive pin 25 is loosely fitted therein. In other words, the drive pin 25 is relatively movable with respect to the disk 61 within the eccentric hole 64, and the disk 61 and the rotor case 21 are not completely fitted to each other.

The stator 3 is constructed on a motor substrate 31, and comprises a bearing portion 32 for rotatably supporting the rotary shaft 22 of the rotor 2 and an armature 35 having a coil 34 and a stator core 33 that faces an inner circumferential surface of the rotor magnet 27. On the motor substrate 31, a motor driving control circuit 4 is configured for controlling driving the rotor 2. The motor driving control circuit 4 has a driving IC 41 in which a circuit for motor driving control is build and three Hall elements H1, H2, and H3 for detecting the rotational angle of the rotor 2. The Hall elements H1, H2, and H3 are attached at positions on the motor substrate 31 to face an edge surface 28 of the rotor magnet 27 on the side of the motor substrate 31 side. Therefore, a voltage corresponding to the magnetic field exerted from the rotor magnet 27 is generated in the Hall elements H1, H2, and H3. The driving IC 41 controls the current to be supplied to the coil 34 based on the output voltage of the Hall elements H1, H2, and H3, and rotates the rotor 2.

Figure 3:
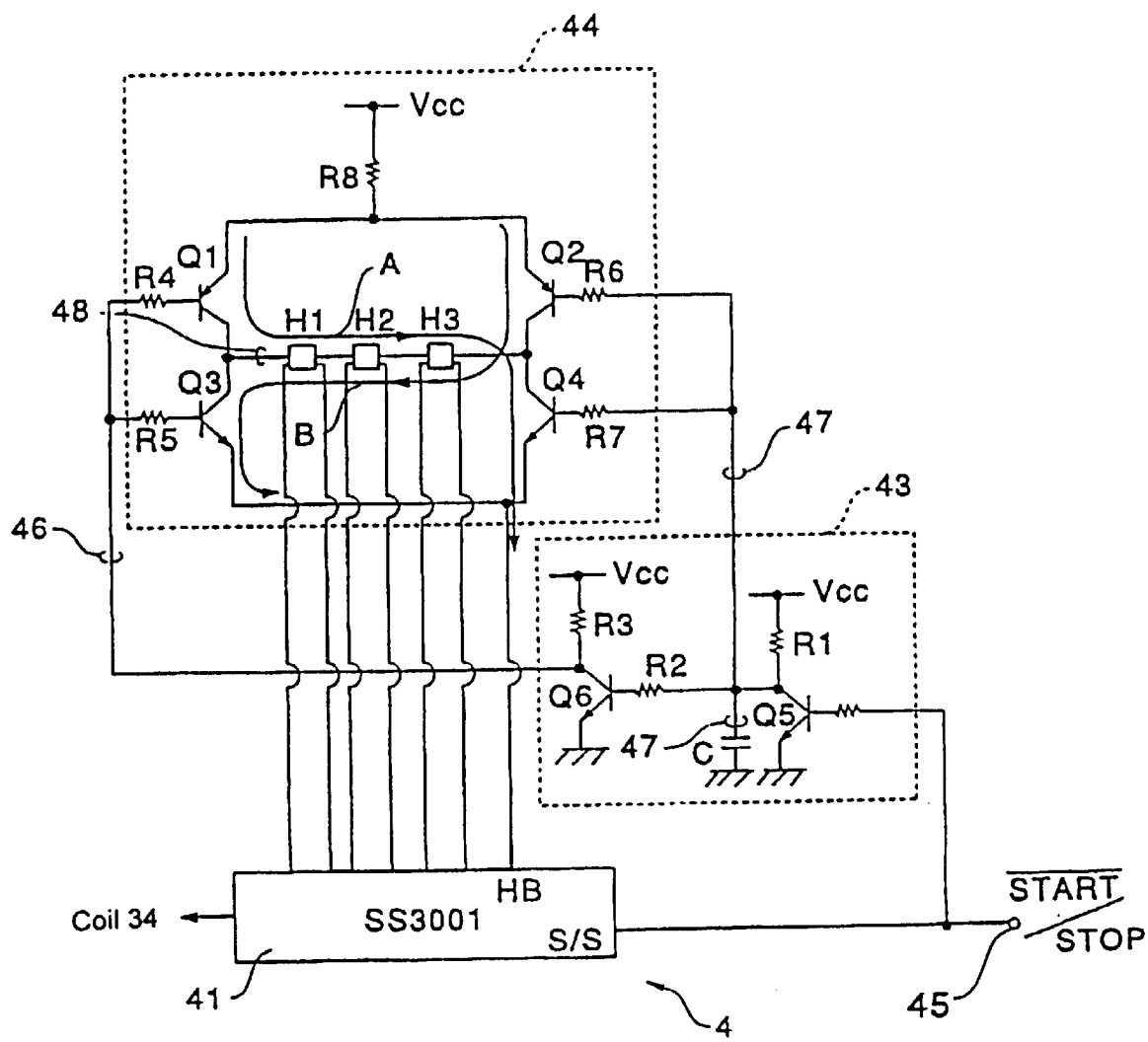
FIG. 3 shows a circuit diagram of a motor driving control circuit.

FIG. 3 is a circuit diagram of the motor driving control circuit 4.

As illustrated in FIG. 3, the motor driving control circuit 4 is equipped with a switching means 43 for charging/discharging a condenser C based on a motor starting signal 45 and a rotational direction controlling signal output means 44 for generating signals to control the rotational direction of the rotor 2 based on the terminal voltage of the condenser C. The switching means 43 and the rotational direction controlling signal output means 44 constitute a reverse rotation driving means.

The switching means 43 has the condenser C and two npn-type transistors Q5 and Q6. The condenser C is grounded with one terminal, and other terminal 47 thereof is to be applied the voltage Vcc via a resistance R1. The transistor Q5 takes a starting signal 45 of the motor 1 as a base input, a collector thereof is connected to the terminal 47 of the condenser C, and an emitter thereof is grounded. A base of the transistor Q6 is connected to the terminal 47 of the condenser C via a resistance R2. The voltage Vcc is applied to the collector of the transistor Q6 via a resistance R3, and the emitter of the transistor Q6 is grounded.

The electric potential at the collector of the transistor Q6 and that at the terminal 47 of the condenser C are respectively outputs 460 and 470 to the rotational direction controlling signal output means 44.

In the rotational direction controlling signal output means 44, pnp-type transistor Q1 and npn-type transistor Q3 are configured in which the output 460 of the switching means 43 is connected to bases thereof via resistance R4 and R5, and pnp-type transistor Q2 and npn-type transistor Q4 in which the output 470 of the switching means 43 is connected to bases thereof via resistance R6 and R7. The voltage Vcc is applied to each emitter of the transistors Q1 and Q2 via a resistance R8. Each of the collectors of the transistors Q1 and Q2 is connected to each of the collectors of the transistors Q3 and Q4. Emitters of the transistors Q3 and Q4 are mutually connected, and then connected to the driving IC 41. The collectors of the transistors Q1 and Q3 are alternately connected by a wire 48 to the collectors of the transistors Q2 and Q4. Three Hall elements H1, H2, and H3 are inserted to the wire 48 in series. This embodiment takes advantage of the fact that, when the direction of the current supplied to the Hall elements H1, H2, and H3 is reversed, the positional signals of the rotor 2 which the Hall elements H1, H2, and H3 provide as an output also are reversed. This determines the rotational direction of the rotor 2 with the current that flows in the wire 48.

In other words, the motor driving control circuit 4 is configured such that, when the current flows in the direction of an arrow A, the Hall elements H1, H2, and H3 provide the normal rotation control signal (the control signal for driving the rotor 2 in the normal direction for recording and reproducing with respect to the disk 61) to the driving IC 41, and when the current flows in the direction of an arrow B, the Hall elements H1, H2, and H3 provide the reverse rotation control signal (the control signal for driving the rotor 2 in the opposite direction of the above normal rotational direction) to the driving IC 41.

Figure 4:
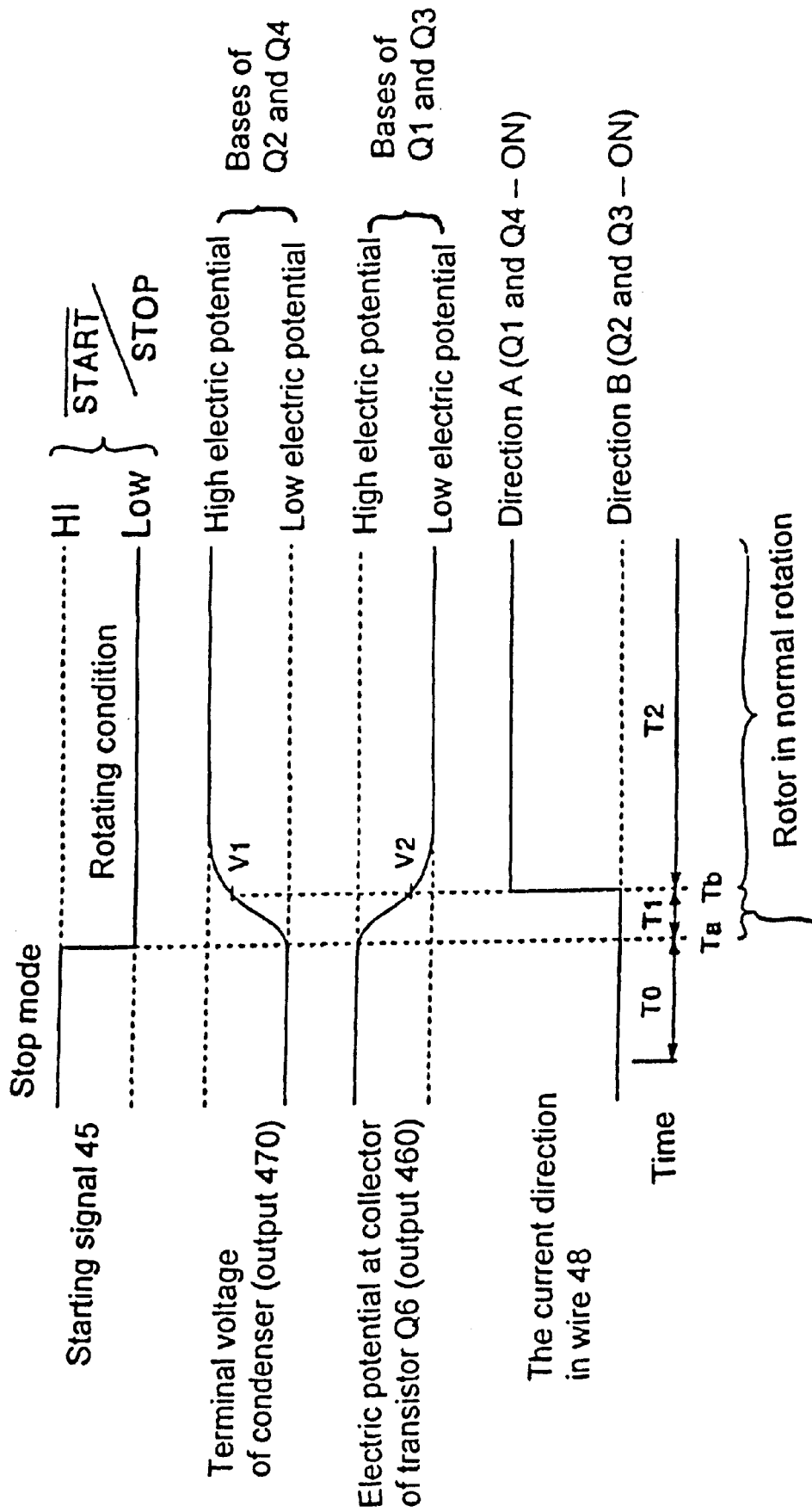
FIG. 4 shows time chart of the control circuit of FIG. 3.

The operation of the motor driving control circuit 4 configured as above is described in the time chart shown in FIG. 4. When the starting signal 45 of the motor 1 is at H1, the motor 1 is in a "stop" mode, and the transistor Q5 of the switching means 43 is turned ON (the period T0). Therefore, since the terminal 47 of the condenser C is discharged, the output 470 of the switching means 43 is at a low electric potential. With this, the transistor Q6 is turned OFF and the output 460 of the switching means 43 is at the high electric potential. Under this condition, the transistors Q1 and Q4 of the rotational direction controlling signal output means 44 are turned OFF, but the transistors Q2 and Q3 are turned ON; therefore, the current flows in the direction of the arrow B.

However, since the motor starting signal 45 is at Hi in this condition, the motor 1 remains in a stop mode.

When the motor starting signal 45 is changed to Low at the point, Ta, from the above condition, the driving IC 41 supplies the current to the coil 34. However, since the transistor Q5 of the switching 43 is turned OFF and the condenser C just starts charging at this point, the terminal voltage (output 470) of the condenser C gradually starts rising along the charging curve defined by the time constant including the resistance R1, and the output 460 gradually starts reclining from the high electric potential. Therefore, until the terminal voltage of the condenser C becomes at least a predetermined electric potential, V1, and the output 460 becomes less than a predetermined electric potential, V2, the transistors Q1 through Q4 remain in ON and OFF conditions thereof in the rotational direction control signal output means 44. For this reason, the current continues flowing in the direction of the arrow B, and the Hall elements H1, H2, and H3 emit the reverse rotation control signal to the driving IC 41 during the period T1. Consequently, the motor 1 rotates the rotor in the reverse rotational direction. In this embodiment, the time constant of the charging/discharging circuit for the condenser C is set so as to obtain about 50 ms of the period for reverse rotation (the period T1).

Then, as the charging of the condenser C progresses, and the terminal voltage of the condenser C becomes more than the electric potential, V1, and the output 470 becomes less than the predetermined electric potential, V2 (at the point, Tb), the transistors Q1 through Q4 of the rotational direction controlling signal output means 44 reverse the ON/OFF status. In other words, the transistors Q1 and Q4 of the rotational direction control signal output means 44 are turned ON, and the transistors Q2 and Q3 are turned OFF. Therefore, the current flows in the direction of the arrow A. Consequently, after the point, Tb (during the period T2), the Hall elements H1, H2, and H3 output the normal rotation control signal to the driving IC 41. Accordingly, the motor 1 changes the rotational direction of the rotor 2 to rotate it in the normal rotational direction.

Figure 5:
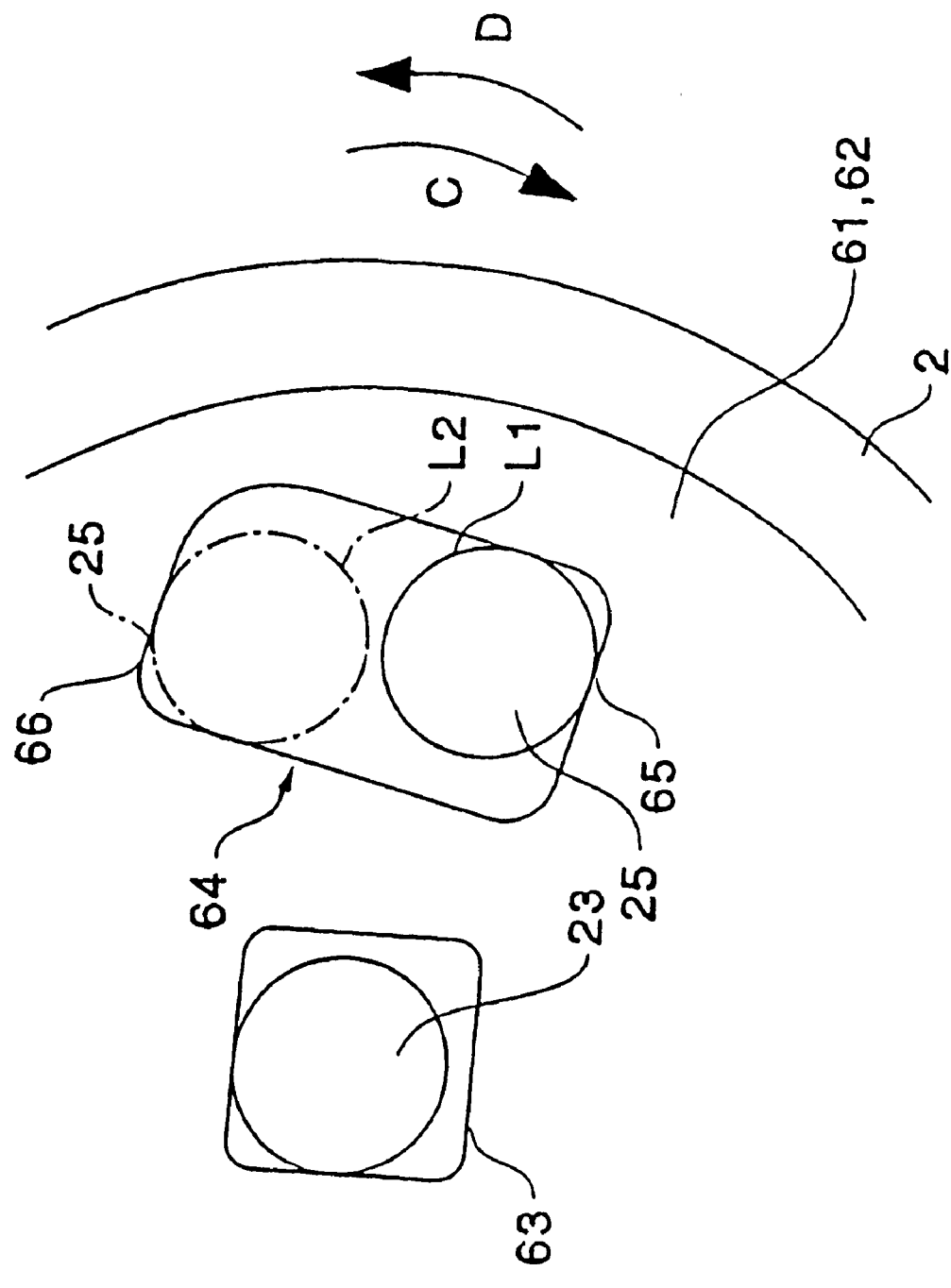
FIG. 5 shows a schematic diagram showing the position of the drive pin in the eccentric hole of the disk.

The driving condition of the disk driving motor 1 with respect to the disk 61 during the above period will be described in detail referring to FIG. 5. FIG. 5 is a schematic diagram showing the position of the drive pin 25 in the eccentric hole 64 of the disk 61.

As illustrated in this figure, when the rotor 2 rotates in the normal direction (of an arrow C), the drive pin 25 contacts the front periphery 65 of the inner periphery of the eccentric hole 64 formed in the center hub 62 of the disk 61, as illustrated by a solid line L1.

Even when the rotor 2 stops rotating, the positional relationship between the drive pin 25 and the eccentric hole 64 does not change (during the period T0). In this "stop" mode, the rotor 2 is rotated in the reverse direction (of an arrow D) for about 50 ms (during the period T1) immediately before the rotor 2 is again rotated in the normal direction. With this, the drive pin 25 is detached from the front periphery 65 of the eccentric hole 64, moves inside the eccentric hole 64, and stops at the position contacting the back periphery of the eccentric hole 64 (at the point, Tb), as illustrated by one-dotted line L2. Since the period T1 for rotating the rotor 2 in reverse is short, the drive pin 25 only relatively moves with respect to the eccentric hole 64, but the disk 61 does not rotate in reverse.

After the rotor 2 is rotated in the normal direction (after the point, Tb, during the period T2), the drive pin 25 moves inside the eccentric hole 64 and runs against the front periphery 65 of the eccentric hole 64 with acceleration. Therefore, the kinetic energy of the rotor 2 is exerted to the disk 61 via the drive pin 25. Accordingly, even if the head has been adhering to the disk 61, the disk 61 breaks the static friction torque and is rotated. For this reason, even if the starting torque of the motor 1 is small, the disk 61 can be driven again smoothly with certainty.

In addition, the motor driving control circuit 4 that performs the above control times the reverse driving and the normal driving based on the terminal voltage at charging/discharging the condenser C. Therefore, only during the predetermined period determined by the time constant of the charging/discharging circuit of the condenser C, the rotor 2 is driven in the reverse direction.

Note that, although the rotor 2 is driven in reverse immediately before it is driven in the normal direction in this embodiment, the rotor 2 may be driven in reverse at any time as long as during the period from the time stopping the rotor 2 in the normal direction to driving it again in the normal direction. For example, immediately after stopping the normal direction driving, the rotor 2 may be driven in reverse. By doing this in advance, the rotor 2 may be driven only in the normal direction when the motor starts.

Also, in this embodiment, the rotational angle for driving the rotor 2 in reverse is set within the range that the drive pin 25 moves inside the eccentric hole 64. However, the rotor 2 may be rotated in reverse more than the above angle. For example, the rotor 2 may be rotated in reverse by the rotational angle for one turn at most. Further, the number of reverse rotations of the rotor 2 is not limited to once, but the reverse rotations and the normal rotations are repeated several times.

In this embodiment, the disk driving motor for rotating a disk by engaging the drive pin with the eccentric hole in the center hub, specifically, the disk driving motor of the 3.5-inch floppy disk has been described. However, the present invention can be used in other disk driving motors. In other words, the present invention can be applied not only in disk driving motors for other floppy disks than 3.5-inch, but also can be widely applied in disk driving motors in which the disk is held relatively movable with respect to the motor in a stop mode.

As described above, with the control method of the disk driving motor of the present invention, the rotor is driven in reverse by a predetermined rotational angle or for a predetermined period. Therefore, by the time the rotor is again driven in the normal direction, the drive pin has been detached from the position in the inner periphery of the eccentric hole to which it contacts at the normal direction rotation. Accordingly, when the rotor is driven in the right rotational direction from this status, the drive pin moves inside the eccentric hole and runs against the inner periphery of the eccentric hole. For this reason, since the kinetic energy of the rotor is exerted on the disk via the drive pin, even when the head has been adhering to the disk, the kinetic energy of the rotor exceeds the static friction torque on the disk to rotate the disk.

Also, the control device of the disk driving motor of the present invention times the reverse direction driving and the normal direction driving based on the terminal voltage at the charging/discharging of the condenser. Therefore, the rotor can be driven in the reverse direction only for a predetermined period determined by the time constant of the charging/discharging circuit of the condenser.

While the foregoing description and drawings represent the invention, it will be obvious to those skilled in the art that various changes may be made therein without departing from the true spirit and scope of the present invention.

What is claimed is:

1. In a method of controlling a disk driving motor having a rotor to which disks are loaded, an improvement comprising the step of:

when the recording/reproducing is performed with respect to a disk, rotating said rotor in a reverse direction by one of a predetermined rotational angle and for a predetermined time during the period from the time said rotor stops rotating in a normal direction to the time said rotor is again driven in said normal direction, said disk having a center hub that includes a center hole and an eccentric hole formed at a position shifted from said center hole; said rotor having a rotary shaft fitted to said center hole and a drive pin loosely fitted to said eccentric hole; and each of said predetermined rotational angle and said predetermined time is such that the drive pin stops at a position substantially contacting a back periphery of the eccentric hole and moves only inside the eccentric hole.

2. The method of controlling a disk driving motor as set forth in claim 1 including the step of driving said rotor in said reverse direction within a rotational angle for one turn thereof before driving it in said normal direction again.

3. The method of controlling a disk driving motor as set forth in claim 1 wherein said rotor is driven in said reverse direction before being driven in the normal direction again so that said drive pin is detached from the position in an inner periphery of said eccentric hole where it contacts at the normal direction rotation.

4. The method of controlling a disk driving motor as set forth in claim 3 wherein, immediately after said rotor starts rotating in said normal direction again, said drive pin runs against said inner periphery of said eccentric hole with acceleration.

5. A control device for a disk driving motor comprising:

a rotor to which disks are loaded; and reverse rotation driving means for driving said rotor in a reverse direction by one of a predetermined rotational angle and for a predetermined time during the period from the time said rotor stops rotating in a normal direction to the time said rotor is again driven in said normal direction, said disk having a center hub that includes a center hole and an eccentric hole formed at a position shifted from said center hole; said rotor having a rotary shaft fitted to said center hole and a drive pin loosely fitted to said eccentric hole; and each of said predetermined rotational angle and said predetermined time is such that the drive pin stops at a position substantially contacting a back periphery of the eccentric hole and moves only inside the eccentric hole.

6. The control device of a disk driving motor as set forth in claim 5 wherein said reverse rotation driving means rotates said rotor in reverse within a rotational angle for one turn of said rotor before being driven in said normal direction again.

7. The control device of a disk driving motor as set forth in claim 5 wherein said reverse rotation driving means rotating said rotor in said reverse direction before being driven in said normal direction again so that said drive pin is detached from the position in an inner periphery of said eccentric hole where it contacts at the normal direction rotation.

8. The control device of a disk driving motor as set forth in claim 7 wherein said reverse rotation driving means controls such that said drive pin runs against said inner periphery of said eccentric hole immediately after said rotor starts rotating in the normal direction again.

9. The control device of a disk driving motor as set forth in claim 5 wherein said reverse rotation driving means has a switching means that controls charging and discharging a condenser based on motor starting signals and a rotational direction controlling signal output means for generating signals that controls the rotational direction of said rotor based on a terminal voltage of said condenser.

10. A control device of a disk driving motor comprising:
a disk mounting portion to which disks are loaded;
a rotor that rotates together with said disk mounting portion;
a stator rotatably supporting said rotor;
a disk driving motor driving control circuit for controlling the driving of said rotor;
Hall elements for detecting rotational angle and direction of said rotor;
reverse rotation driving means for providing an output to said driving control circuit, a control signal for driving said rotor in one of the normal direction and reverse direction based on a detected signal of the rotational direction from said Hall elements;
so that, when the recording/reproducing is performed with respect to said disk, said rotor is driven in the reverse direction by one of a predetermined rotational angle and for a predetermined time during the time said rotor stops rotating in said normal direction to the time it is again driven in said normal direction, said disk having a center hub that includes a center hole and an eccentric hole formed at a position shifted from said center hole; said rotor having a rotary shaft fitted to said center hole and a drive pin loosely fitted to said eccentric hole; and each of said predetermined rotational angle and said predetermined time is such that the drive pin stops at a position substantially contacting a back periphery of the eccentric hole and moves only inside the eccentric hole.

11. The control device of a disk driving motor as set forth in claim 10 wherein said drive pin is loosely fitted to said eccentric hole formed at a position shifted from said center hole; and said reverse rotation driving means rotates said rotor in said reverse direction before being driven in said normal direction again so that said drive pin is detached from the position in an inner periphery of said eccentric hole where it contacts at the normal direction rotation.

12. The control device of a disk driving motor as set forth in claim 10 wherein said reverse rotation driving means has a switching means that controls charging and discharging a condenser based on motor starting signals and a rotational direction controlling signal output means for generating signals that controls the rotational direction of said rotor based on a terminal voltage of said condenser.

* * * * *